United States Patent
Chang

(10) Patent No.: US 7,979,596 B2
(45) Date of Patent: Jul. 12, 2011

(54) MOUSE WITH EXPANDABLE MEMORY CAPACITY AND AN OPERATING METHOD THEREOF

(75) Inventor: Yuan-Jung Chang, Hsinchuang (TW)

(73) Assignee: Dexin Corporation, Taipei Hsien (TW)

( * ) Notice: Subject to any disclaimer, the term of this patent is extended or adjusted under 35 U.S.C. 154(b) by 153 days.

(21) Appl. No.: 12/453,082

(22) Filed: Apr. 29, 2009

(65) Prior Publication Data

US 2010/0281184 A1    Nov. 4, 2010

(51) Int. Cl.
*G06F 3/00* (2006.01)
(52) U.S. Cl. .......... 710/13; 710/8; 710/62; 710/72; 710/73; 345/157; 345/162
(58) Field of Classification Search .......... None
See application file for complete search history.

(56) References Cited

U.S. PATENT DOCUMENTS

| 6,360,364 B1 * | 3/2002 | Chen et al. ............ 711/169 |
| 2005/0076120 A1 * | 4/2005 | Wu ............ 709/224 |
| 2006/0007151 A1 * | 1/2006 | Ram ............ 345/163 |
| 2006/0250361 A1 * | 11/2006 | Chang ............ 345/163 |
| 2010/0201638 A1 * | 8/2010 | Peng et al. ............ 345/173 |

OTHER PUBLICATIONS

Goodwin, J. et al., Memory Mouse, Jul. 1, 1994, IBM technical Disclosure Bulletin, pp. 1-3.*

* cited by examiner

*Primary Examiner* — Eron J Sorrell
(74) *Attorney, Agent, or Firm* — Rosenberg, Klein & Lee

(57) ABSTRACT

A mouse with expandable memory capacity includes a button set with a plurality of buttons, a build-in memory, a card connector, and a controller. Therein, the card connector is for connecting with a memory card. The controller is connected to the button set, the build-in memory, and the card connector, wherein the controller is for controlling the operation of the build-in memory and for controlling the operation of the memory card so as to store a button instruction set. The controller further controls and uses the memory card to form an expansion memory for the build-in memory. The button instruction set records an operation instruction that is represented by combinations formed from one or more of the buttons. Therefore, the goal of expanding memory capacity of the mouse is achieved.

8 Claims, 4 Drawing Sheets

MOUSE WITH EXPANDABLE MEMORY CAPACITY AND AN OPERATING METHOD THEREOF

BACKGROUND OF THE INVENTION

1. Field of the Invention

The present invention relates to a mouse; and in particular, the present invention is related to a mouse that uses a memory card for expanding its memory capacity and an operating method for the aforementioned mouse

2. Description of Related Art

Application program software and gaming software have been developing rapidly in recent years, and due to this rapid development, users now have more choices and so are becoming more particular about operation convenience instead of only being concerned with basic functions. For this reason, many manufacturers subsequently developed various improvements to the design of the mouse.

One of these improvements is having more and more operation control buttons on the mouse so as to satisfy the requirement of various software or gaming operations. Another improvement is that there are currently designs of mouse with build-in memory, for directly storing the button instruction of the mouse within the build-in memory of the mouse, so that the controller within the mouse may be directly operated. Therefore there is no need to go through special or specific driver program in the operation system (OS) to drive the controller in order to operate the mouse. By storing the button instruction of the mouse with the build-in memory of the mouse, the user may enjoy the same setting of the button instruction even when the mouse is attached to different computers.

However, for cost consideration, the storage capacity of the build-in memory for a mouse tends to be limited; furthermore the software used by the user may be numerous in number. Therefore, considering the current design structure of the mouse with internal memory, along with the consideration of the increasing number of control buttons on the mouse, the user may not be able to adequately and freely add the desired button instruction due to limited storage capacity of the build-in memory. Thereby the instruction set within the build-in memory may not completely conform to the need of the users.

This limitation is especially true for a user that utilizes a mouse for gaming control. This is because a mouse for gaming tends to have specific instruction sets commonly used by professional players that are complicated and therefore large in data size. This means that if a mouse only has build-in memory, it may be inconvenient for those game players due to the fact that the instruction sets are limited by the storage capacity of the mouse.

SUMMARY OF THE INVENTION

The object of the present invention is to utilize memory cards that are portable and has large storage capacity, wherein the memory cards are to be used as expandable memory for the mouse. Thereby the controller of the mouse may directly save and read the button instruction set that has been stored within either an original build-in memory or an additionally connected memory card.

In order to achieve the aforementioned objects, according to an embodiment of the present invention, a mouse with expandable memory capacity is provided, the mouse includes: a button set, a build-in memory, a card connector, and a controller that is connected with the button set, the build-in memory, and the card connector. Therein, the button set has a plurality of buttons; the card connector is for connecting to a memory card; and the controller is for controlling the operation of both the build-in memory and the memory card so as to store a button instruction set. To be more specific, the controller controls and uses the memory card to form an expansion memory for the build-in memory; therefore there is more memory capacity to store the button instruction set. Therein, the button instruction set that has been stored is for recording an operation instruction that is represented by combinations formed from one or more of the buttons; and the operation instruction is a keyboard code, a mouse code, and/or a flow control code.

In order to achieve the aforementioned objects, according to another embodiment of the present invention, an operation method for a mouse with expandable memory capacity for performing storing operation to the memory is provided, wherein the mouse is connected to a computer system, the steps of the operation method includes: first, connecting a memory card to the mouse; then receiving a button instruction set output from the computer system; next determine whether or not a build-in memory of the mouse has enough storage capacity to store the button instruction set. If the outcome of the determination is negative, meaning that the build-in memory does not have enough storage capacity to store the button instruction set, then the button instruction set is stored to the memory card. Lastly, renew then activate the button instruction set that is either within the memory card or the build-in memory. Therein the memory card is used and controlled by the mouse as an expansion memory for the build-in memory.

In order to achieve the aforementioned object, according to yet another embodiment of the present invention, an operation method for a mouse with expandable memory capacity for performing reading operation to the memory is provided, the mouse is connected to a computer system and has a plurality of buttons, the steps of the operation method includes: first, confirming the operation of a build-in memory of the mouse and confirming the operation of a memory card connected to the mouse, and then receiving a triggering signal generated through the combination of one or more of the buttons; next determine if the triggering signal conforms to the button instruction set that has been stored within the build-in memory of the mouse or if the triggering signal conforms to the button instruction set that has been stored within the memory card connected to the mouse. Lastly, outputting an operation instruction according to the button instruction set of the build-in memory or the memory card that conforms to the triggering signal. Therein the mouse controls and uses the memory card to form an expansion memory for the build-in memory.

DETAILED DESCRIPTION OF THE PREFERRED EMBODIMENTS

The present invention uses memory cards that are portable and has large storage capacity, and allow the controller of the mouse to directly save and read the button instruction set that has been stored within the original build-in memory or the additionally connected memory card.

Figure 1:
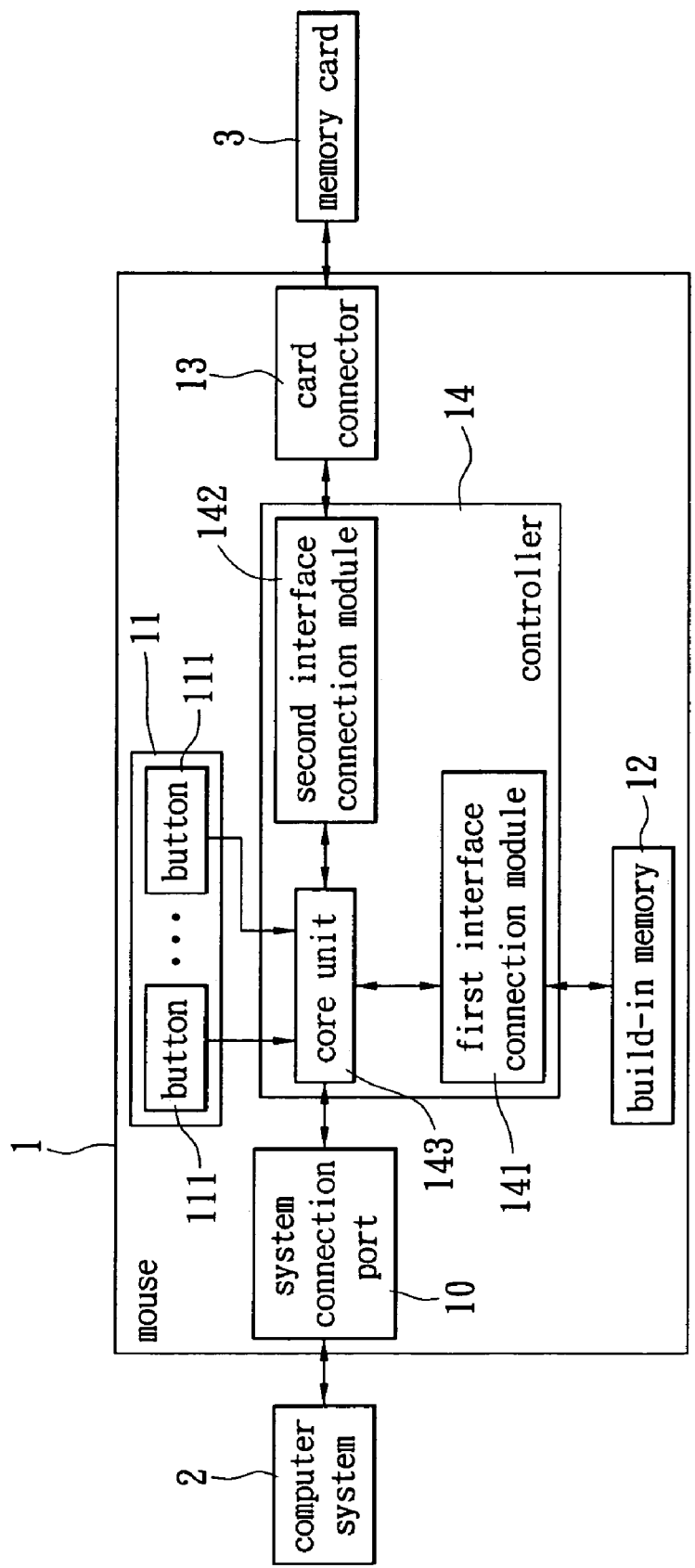
FIG. 1 shows a block diagram of a mouse with expandable memory capacity according to an embodiment of the present invention.
Figure 2:
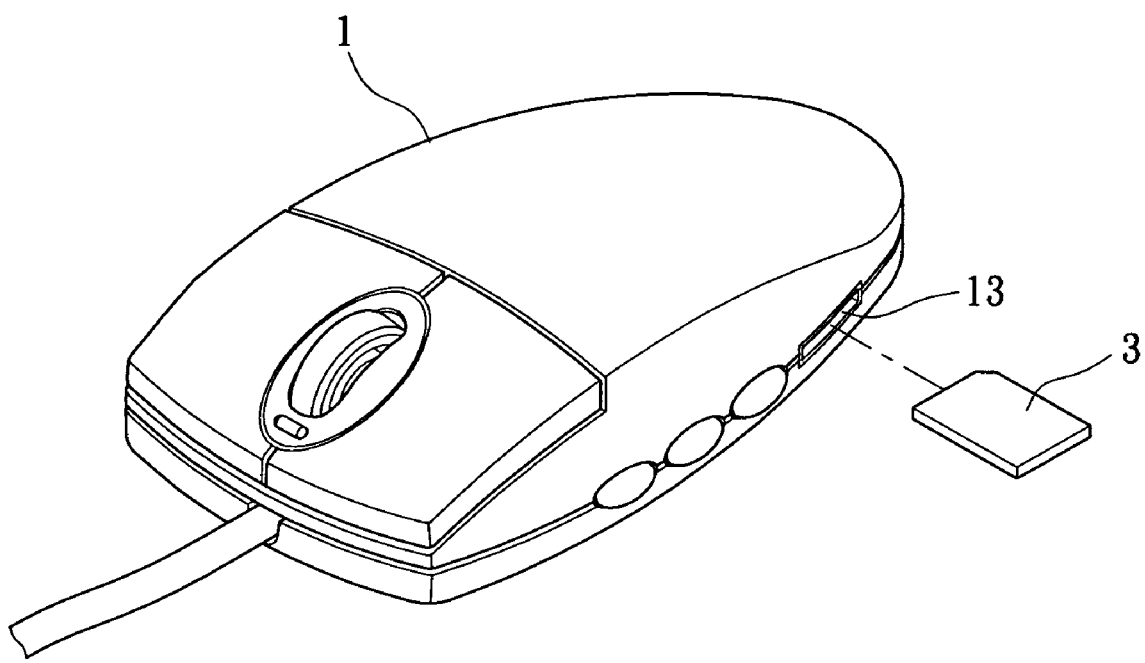
FIG. 2 shows a schematic diagram of a mouse with expandable memory capacity according to an embodiment of the present invention.

Please refer to FIGS. 1 and 2, which respectively show the block diagram and schematic diagram of a mouse with expandable memory capacity according to an embodiment of the present invention. The present embodiment provides a mouse 1 with expandable memory capacity, and the mouse 1 includes: a system connection port 10, a button set 11, a build-in memory 12, a card connector 13, and a controller 14. Therein, the system connection port 10 is connected with the controller 14, and is for externally connecting to a computer system 2; the system connection port 10 is for transceiving data between the controller 14 and the computer system 2. In actual design, the system connection port 10 may be connected to the computer system 2 in a wire or wireless way.

The button set 11 further includes a plurality of buttons 111, and according to different functional design upon the main body of the mouse 1, the number and location of the buttons 111 may be different, and so are not limited to the embodiment shown by FIG. 2.

The build-in memory 12 is the memory originally designed to be permanently connected to the circuit board (not shown) within the mouse 1; the design of the build-in memory 12 may for example be electrically erasable programmable read-only memory (EEPROM) or flash memory. Furthermore the card connector 13 is provided for the user to connect a memory card 3, wherein the format of the card connector 13 is not limited to any specific kind of memory card, but rather may be designed accordingly so as to be applicable to the memory cards 3 that are available on the current market.

The controller 14 is connected to the button set 11, the build-in memory 12, and the card connector 13; wherein the controller 14 is for controlling the operation of the build-in memory 12 and the memory card 3 so as to store a button instruction set. Therein, the button instruction set is for recording an operation instruction, such as a keyboard code, a mouse code, and a flow control code that are represented by combinations formed from one or more of the buttons 111. Of course, those skilled in the art should realize, the operation instruction recorded by the button instruction set is not meant merely for the buttons 111 of the mouse 1, but may further include a keyboard that is connected to the computer system 2, a command (i.e. an instruction) of any key combination from a human interface device (HID), or even simulated command generated from relevant time delay or other conditional determination.

When the user operates the mouse 1, the controller 14 receives a triggering signal generated by combinations formed from one or more of the buttons 111 being pressed by the user. At this time the controller 14 compares the triggering signal with the button instruction set stored in the build-in memory 12 or the memory card 3, wherein the operation instruction is generated according to the matching of the button instruction set and the triggering signal, and the operation instruction is encoded by the controller for outputting to the computer system 2 via the system connection port 10.

In further detail, the controller 14 further includes: a first interface connection module 141, a second interface connection module 142, and a core unit 143. Therein, the first interface connection module 141 of the controller 14 is connected to the build-in memory 12, so as to drive and control the operation of the build-in memory 12. The second interface connection module 142 of the controller 14 is connected to the card connector 13, so as to drive and control the memory card 3 that may be connected to the card connector 13. The core unit 143 of the controller 14 is connected to the system connection port 10 and the button set 11, so as to process the command issued from the computer system 2 and to process the triggering signal generated by the button set 11. Furthermore the core unit 143 may save and read the data that is within the build-in memory 12 through the first interface connection module 141 and save and read the data that is within the memory card 3 through the second interface connection module 142.

Additionally, in the present embodiment, because the controller 14 controls and uses the memory card 3 to form an expansion memory for the build-in memory 12, therefore when it comes to saving and reading operation, the build-in memory 12 has a higher priority when it comes to the order of saving and reading.

Next is the further explanation via example regarding the ways the button instruction set is generated:

The first way is characterized in that the user may directly utilize the portable characteristic of the memory card 3, and thereby retrieve the necessary button instruction set from another computer; in addition it is also possible to retrieve the button set instruction via the exchange of memory card 3; so that by connecting the memory card 3 to the mouse 1, the controller 14 then may use the button instruction set that has been stored within the memory card 3.

The second way is that the computer system 2 may execute an application program (not shown) for the user to control and configure. Therein due to the fact that the application program is designed by software, so that there may be various different appearances, therefore it is not explained with figures. The application program includes an instruction setting interface, and the instruction setting interface is designed according to the configuration of the button set 11 of the mouse 1. The instruction setting interface is for facilitating the user to configure or set the operation instruction that is to be represented by the combinations of one or more of the buttons 111, so that an integrated button instruction set may be stored within the mouse 1, thereby allowing the controller 14 of the mouse 1 to operate.

In the present way, the application program may further include a storage path assigning interface for directly assigning and storing the button instruction set to the memory card 3 and not the build-in memory 12. Thereby, having the storage path assigning interface is convenient for the user if the second way of relying on the exchange of the memory card 3 to maintain the same button instruction set is utilized.

In a third way, the application program may further include an import interface, the import interface is for loading a large file set and converting the large file set into the button instruction set, wherein the button instruction set is then stored within the mouse 1. Therein the large file set may for example be a file downloaded from the internet, and the large file set may include button instruction already configured by other users.

Figure 3:
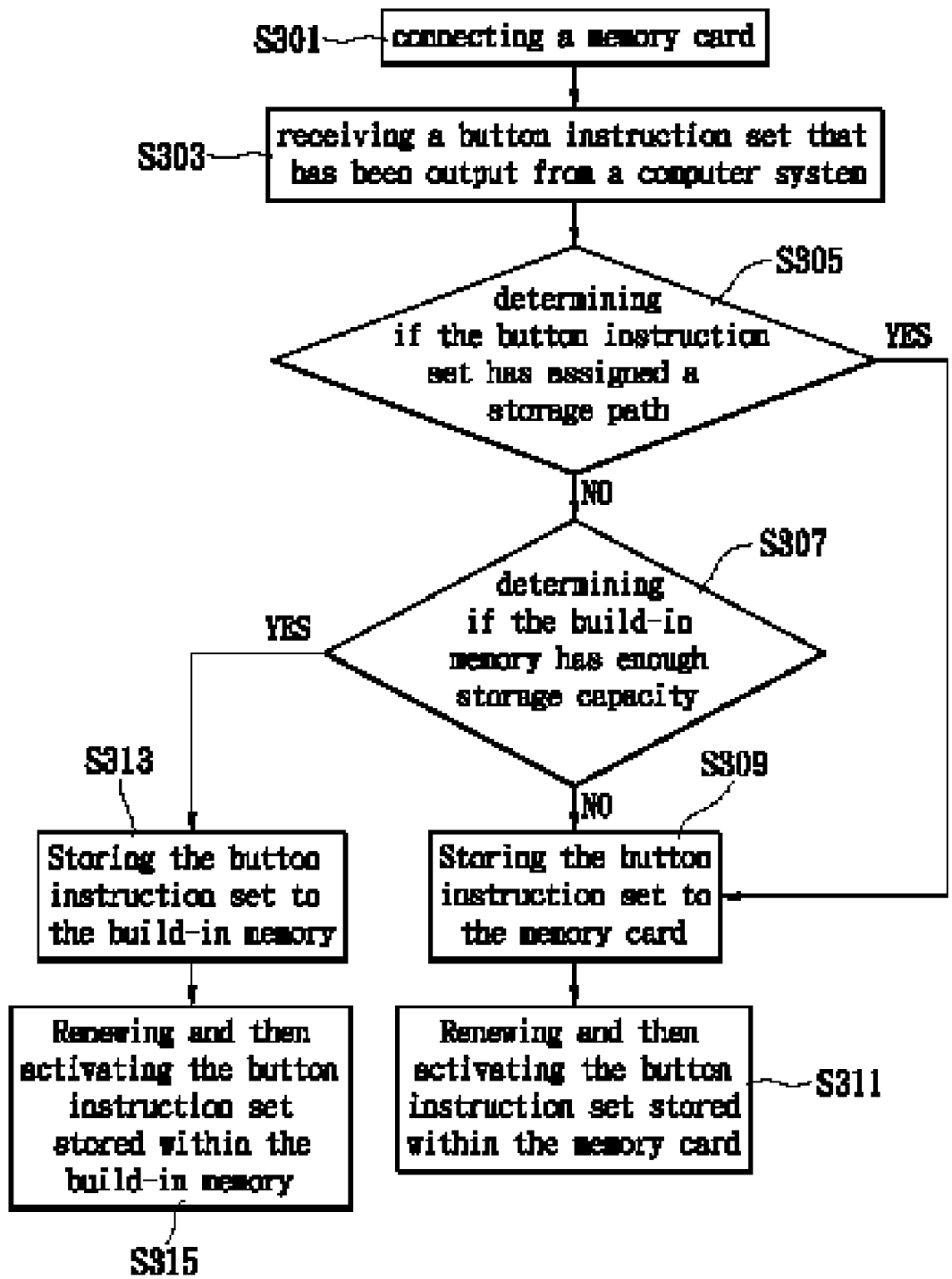
FIG. 3 shows an operation method flow chart of a mouse performing storing operation to the memory of the mouse according to an embodiment of the present invention.

Next, in conjunction to the aforementioned physical structure of the mouse 1, please also refer to the following explanation regarding operation flow chart steps. Please refer to FIG. 3, which shows an operation method flow chart of a mouse 1 performing storing operation to its own memory as according to an embodiment of the present invention. As shown by FIG. 3, the operation method provided by the present embodiment is a method that performs storing operation to the memory of the mouse 1. The steps of the operation method comprising: first, the mouse 1 receives and connects with a memory card 3 from the user (S301), and the mouse 1 then receives a button instruction set output from the computer system 2 (S303). Next, determine whether or not the user has assigned a storage path within the button instruction set (S305). If the determination in (S305) is No, then that means the user did not assign a storage path after finishing configuring the button instruction set, which means that the saving of the button instruction set within the mouse 1 is to an build-in memory 12 of the mouse 1, as according to original design priority.

At this time, because the build-in memory 12 has a certain limited storage capacity due to cost consideration, therefore it is necessary to determine whether or not the build-in memory 12 of the mouse 1 has enough storage capacity to store the button instruction set (S307). If the determination of (S307) is No, then that means the storage capacity of the build-in memory 12 is not large enough to store the button instruction set currently configured by the user, therefore the button instruction set is stored within the memory card 3 (S309). On the other hand, if the determination of (S305) is yes, then that means the user has assigned a storage path for the button instruction set, which means storing the button instruction set to the memory card 3, therefore step (S309) is executed, so as to have the button instruction set stored within the memory card 3.

After executing step (S309), a controller 14 of the mouse 1 renews and then activates the button instruction set within the memory card 3 (S311), so that the activated button instruction set may be utilized as required.

Additionally, in the aforementioned step (S307), if the determination is Yes, then that means the build-in memory 12 has enough storage capacity for storing the button instruction set that has been configured by the user. Therefore, the button instruction set is directly stored within the build-in memory 12 of the mouse 1 (S313). Next the controller 14 renews then activates the button instruction set within the build-in memory 12 (S315), so that the activated button instruction set may be utilized as required.

Figure 4:
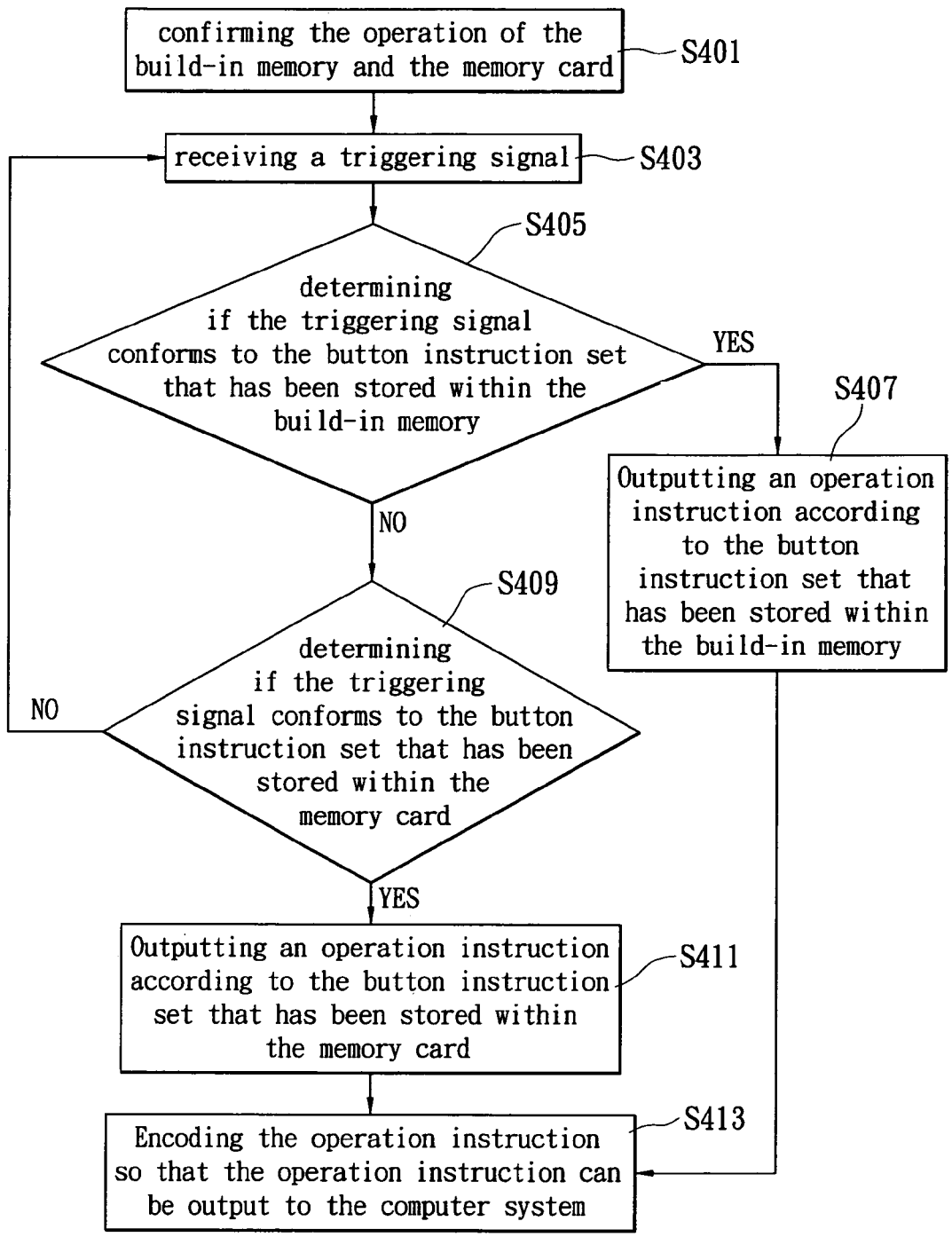
FIG. 4 shows an operation method flow chart of a mouse performing reading operation from the memory of the mouse according to an embodiment of the present invention.

Next please refer to FIG. 4, which shows an operation method flow chart of a mouse 1 performing reading operation from the memory of the mouse 1 according to an embodiment of the present invention. As shown by FIG. 4, the operation method provided by the present embodiment is a method that performs reading operation to the memory of the mouse 1. To be noted for the present embodiment, prior to the operation steps of reading the memory, either the build-in memory 12 of the mouse 1, or the memory card 3 that is connected to the mouse 1, or both, has to already have the button instruction set stored therein.

The steps of operation method for reading the memory of the mouse 1 includes: first confirming the normal operation of the build-in memory 12 and the memory card 3 that is connected to the mouse 1 (S401). Then, standby to receive a triggering signal generated by the user pressing on one or more of the buttons 111 (S403).

When the controller 114 of the mouse 1 receives the triggering signal, the controller 114 determines if the triggering signal conforms to the button instruction set stored within a build-in memory 12 of the mouse 1 (S405). If the determination in step (S405) is Yes, then that means the triggering signal generated by the user from pressing one or more of the buttons 111 is valid, and that the triggering signal corresponds with the button instruction set stored within the build-in memory 12, therefore the corresponding operation instruction generated from the matching of the button instruction set and the triggering signal is output according to the button instruction set that has been stored within the build-in memory 12 (S407), wherein the operation instruction is a keyboard code, a mouse code, and/or a flow control code. On the other hand, if the determination in step (S405) is No, then either the triggering signal generated by the user pressing one or more of the buttons 111 does not exist within the button instruction set build-in memory 12, therefore there is no corresponding matches; or the build-in memory 12 does not have the button instruction set stored therein. At this time, the controller 114 continues to determine if the triggering signal conforms to the button instruction set stored with the memory card 3 that is connected to the mouse 1 (S409).

If the determination in step (S409) is yes, then that means the triggering signal generated by the user from pressing one or more of the buttons 111 is valid, and that the triggering signal corresponds with the button instruction set stored within the memory card 3, therefore the corresponding operation instruction generated from the matching of the button instruction set and triggering signal is output according to the button instruction set that has been stored within the memory card 3 (S411). Furthermore, regarding the operation instruction generated after the step (S411) or the step (S407), the operation instruction is then encoded by the controller 114 for outputting to the computer system 2 (S413).

If the determination in step (S409) is No, then that means the triggering signal generated by the user pressing one or more of the buttons 111 does not match the button instruction set that has been stored within the build-in memory 12 of the mouse 1, nor does it match the button instruction set that has been stored within the memory card 3 connected to the mouse 1; therefore the triggering signal is invalid, so that the mouse 1 does not generate any operation nor movement, and then the entire steps may be repeated again (S403); in other words the standby for waiting a triggering signal generated by the user pressing buttons 111 is repeated.

As described above, the mouse 1 design of the present invention includes an internal build-in memory 12 and an externally connected memory card 3, so that the user may freely store the button instruction set within the mouse directly as suppose to relying on button instruction set stored within operating system of a computer. Therefore, even when the mouse 1 is connected to another computer, or when the memory card 3 is exchanged to be connected to another mouse 1 on another computer, the user may still enjoy the same configuration settings to the button instruction set. Furthermore there is no longer the issue of limited storage capacity for the build-in memory since the memory card may act as the expansion memory. Additionally, for users that may require frequent exchange of computer or button instruction sets, the present invention is convenient due to the function of memory card exchange made possible by the design of mouse 1.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:
1. A mouse with expandable memory capacity that is connected to a computer system, comprising:
a button set, wherein the button set comprises a plurality of buttons;
a build-in memory;
a card connector, for connecting to a memory card;

a controller, connecting to the button set, the build-in memory, and the card connector, wherein the controller is for controlling operations of the build-in memory and the memory card so as to store a button instruction set; and an application program with an instruction setting interface, comprising:
- an import interface, for loading a large file set and converting the large file set into the button instruction set; and
- a storage path assigning interface, for assigning the button instruction set to the memory card;
- wherein the instruction setting interface is designed according to the configuration of the button set of the mouse, and is for setting and generating the button instruction set;

wherein, the controller controls and uses the memory card to form an expansion memory for the build-in memory, the button instruction set is for recording an operation instruction represented by combinations formed from one or more of the buttons and the operation instruction set is a keyboard code, a mouse code, and/or a flow control code.

2. The mouse with expandable memory capacity according to claim 1, wherein the controller is further for receiving a triggering signal generated by one of the buttons or combinations of the buttons, and for comparing the triggering signal with the button instruction set; wherein the operation instruction is generated by a comparison of the triggering signal and the button instruction set, and encoded by the controller before being outputted to the computer system.

3. An operation method for a mouse with expandable memory capacity, for performing storing operation to the memory, wherein the mouse is connected to a computer system, comprising:
- connecting a memory card to the mouse;
- receiving a button instruction set converted from a large file set by an import interface of the computer system and output from the computer system;
- determining whether a storage path is assigned to the button instruction set by a storage path assigning interface of the computer system, wherein the storage path is designated to the memory card;
- determining whether or not a build-in memory of the mouse has enough storage capacity to store the button instruction set when the storage path is not assigned to the button instruction set;
- storing the button instruction set to the memory card when the build-in memory does not have enough storage capacity to store the button instruction set or when the storage path is assigned to the button instruction set;
- storing the button instruction set to the build-in memory when the build-in memory has enough storage capacity to store the button instruction set; and
- renewing and activating the button instruction set that is either within the memory card or the build-in memory.

4. The operation method according to claim 3, wherein the computer system further comprises an application program, and the application program has an instruction setting interface, the instruction setting interface is designed according to the configuration of the button set of the mouse, and is for setting and generating the button instruction set.

5. The operation method according to claim 4, wherein the mouse has a plurality of buttons, and the button instruction set records an operation instruction represented by combinations formed from one or more of the buttons.

6. The operation method for a mouse with expandable memory capacity according to claim 3, further comprising performing a reading operation to the memory, wherein the reading operation further comprises:
- receiving a triggering signal generated through the combination of one or more of the buttons;
- determining if the triggering signal conforms to the button instruction set that has been stored within a build-in memory of the mouse or if the trigger signal conforms to the button instruction set that has been stored within a memory card that connects to the mouse; and
- outputting an operation instruction according to the button instruction set of the build-in memory or the button instruction set of the memory card that conforms to the triggering signal.

7. The operation method according to claim 6, further comprising:
- confirming the operation of the build-in memory and the memory card, so as to standby and receive the triggering signal; and
- encoding the operation instruction before outputting the encoded operation instruction to the computer system.

8. The operation method according to claim 6, wherein the button instruction set records the operation instruction, and the operation instruction is represented by one of the buttons or combinations of the buttons.

* * * * *